United States Patent [19]

Grundman et al.

[11] 4,301,777
[45] Nov. 24, 1981

[54] FUEL INJECTION PUMP

[75] Inventors: Richard G. Grundman; Richard S. Knape, both of Grand Rapids, Mich.

[73] Assignee: General Motors Corporation, Detroit, Mich.

[21] Appl. No.: 98,079

[22] Filed: Nov. 28, 1979

[51] Int. Cl.³ .............................................. F02D 7/00
[52] U.S. Cl. ................................ 123/379; 123/387; 123/445; 123/495
[58] Field of Search ............... 123/379, 369, 385, 387, 123/445, 446, 495; 417/293, 507

[56] References Cited

U.S. PATENT DOCUMENTS

| | | | |
|---|---|---|---|
| 2,165,696 | 7/1939 | Charter | 123/379 |
| 2,786,460 | 3/1957 | Barfod | 123/379 |
| 2,831,473 | 4/1958 | Liardet | 123/387 |
| 3,547,092 | 12/1970 | Knight | 123/387 |
| 3,648,673 | 3/1972 | Knape | 123/379 |
| 3,856,438 | 12/1974 | Simko | 123/495 |

Primary Examiner—Charles J. Myhre
Assistant Examiner—Magdalen Moy
Attorney, Agent, or Firm—Arthur N. Krein

[57] ABSTRACT

A fuel injection pump assembly in which fuel delivered from individual cam lobe driven pump plungers is controlled by an engine driven drive shaft rotated control valve, the position of which, relative to the spill ports from the plungers, is controlled by means of a hydraulic governor. A separate governor cam lobe is used to also actuate the plungers whereby fluid supplied to the hydraulic governor is at a flow rate proportional to pump speed and therefore, engine speed.

4 Claims, 8 Drawing Figures

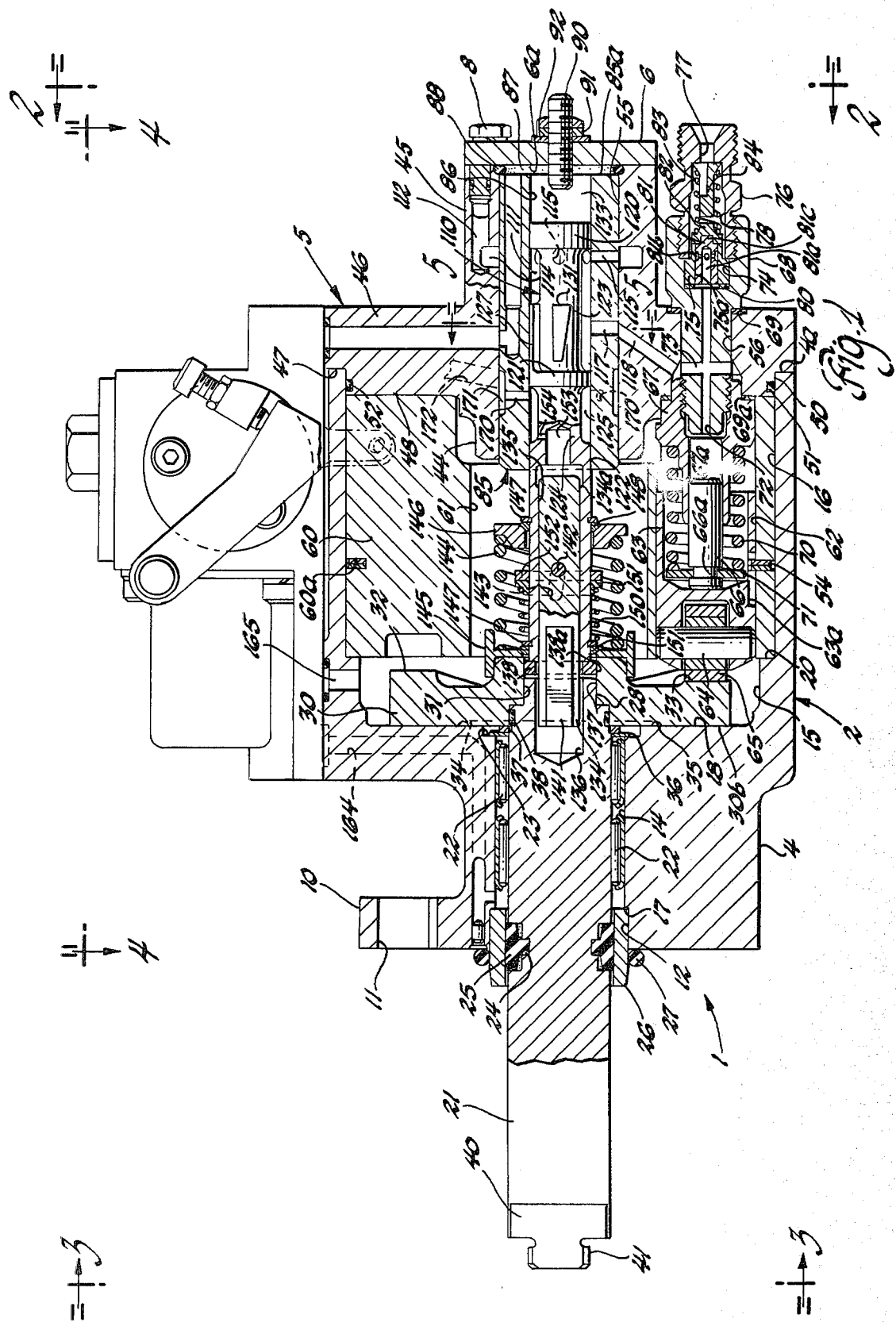

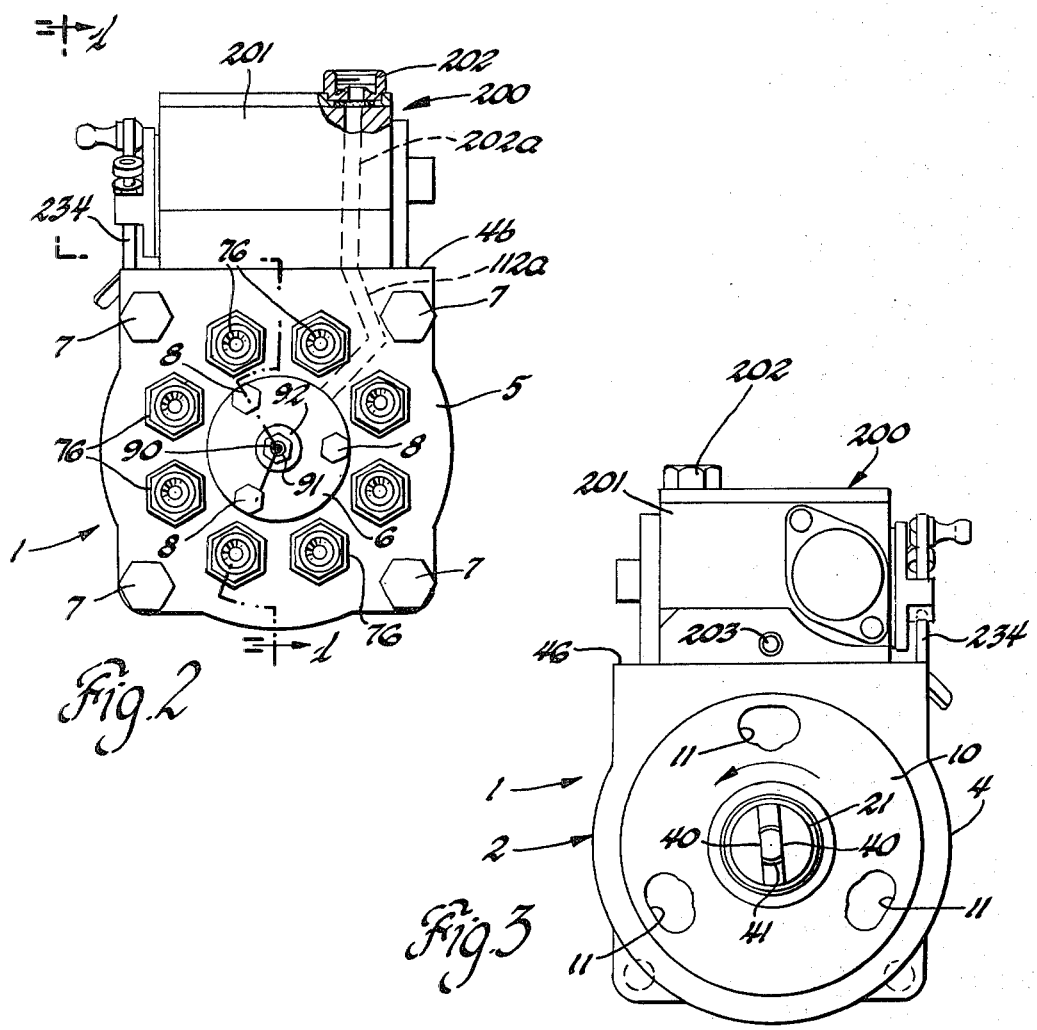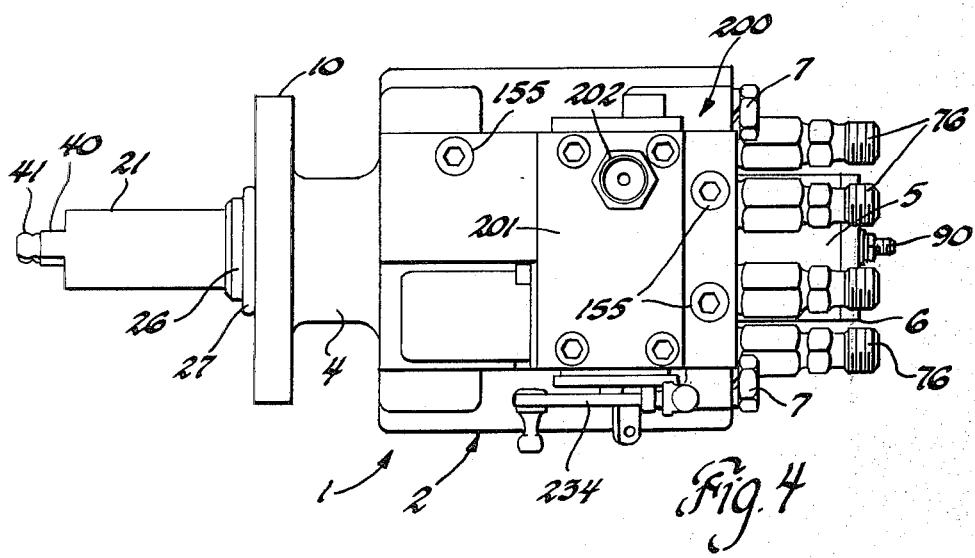

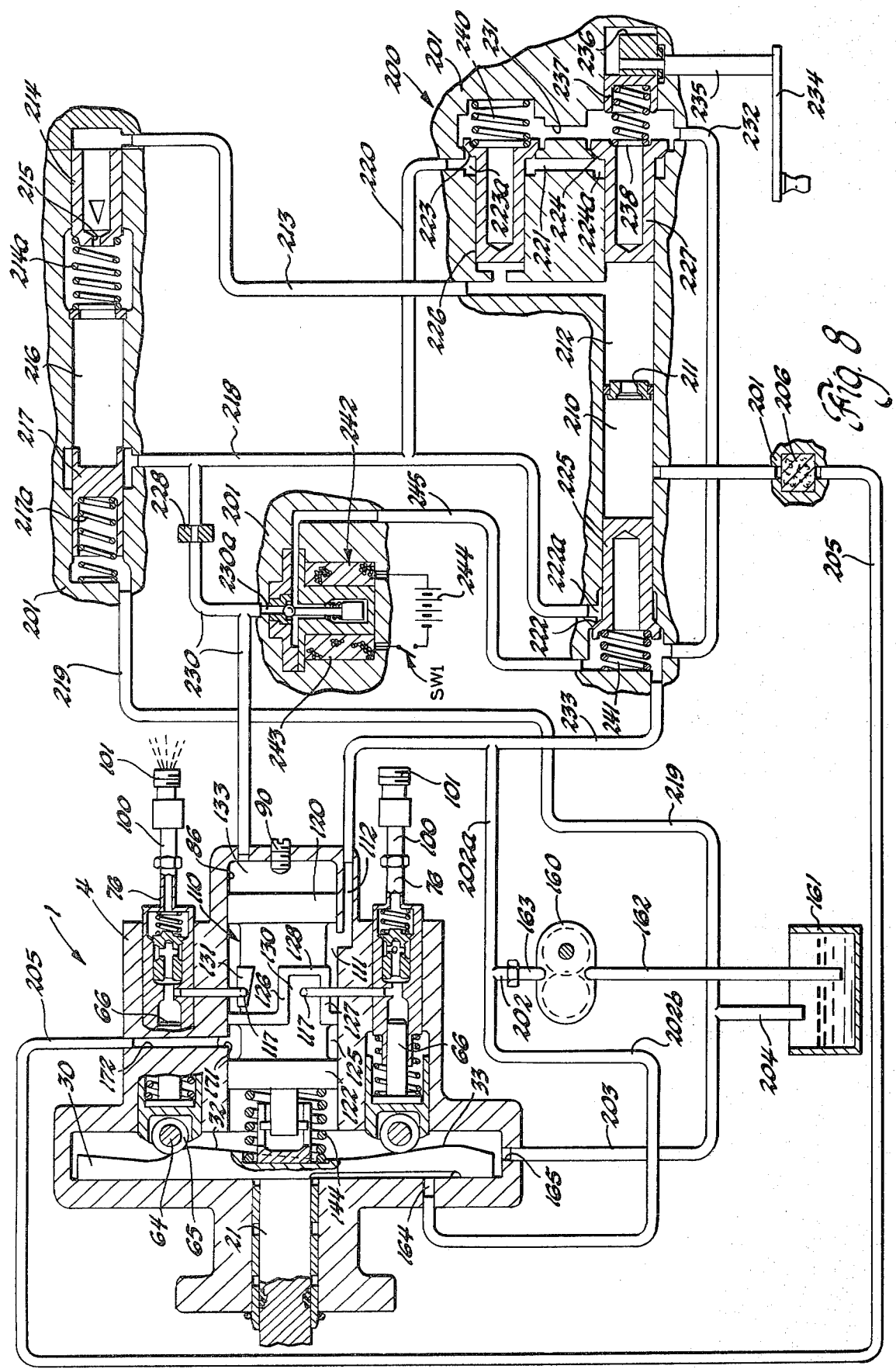

FUEL INJECTION PUMP

This invention relates to a fuel injection pump and, in particular, to a fuel injection pump adapted to deliver metered amounts of fuel to each of a plurality of fuel injection nozzles located to discharge fuel into the associated cylinders of an internal combustion engine.

DESCRIPTION OF THE PRIOR ART

Multiple plunger fuel injection pumps of the type used to sequentially supply fuel to a plurality of injection nozzles for direct injection into the associated cylinders of a diesel engine are well known, as disclosed, for example, in U.S. Pat. No. 3,648,673 entitled "Fuel Injection Pump" issued Mar. 14, 1972 to Richard S. Knape. In this type multiple plunger fuel injection pump, a rotatably control valve, which is also axially movable as by a mechanical or hydraulic governor mechanism, is used to control the quantity of fuel supplied to each nozzle for injection into an associated cylinder as function of engine speed and load conditions.

In the pump structure disclosed in the above identified U.S. Pat. No. 3,648,673, a hydraulic type all-speed governor operated by spill fuel is used to axially control movement of the control valve. However, since the spill fuel is interrupted and not uniform as supplied during each injection pump stroke of a plunger, the governor control of the control valve itself will vary accordingly and, therefore, precise metering of the quantity of fuel injected is not always attainable.

SUMMARY OF THE INVENTION

The present invention relates to a multiple plunger fuel injection pump assembly in which the fuel delivered from individual pump plungers is adapted to be controlled by a hydraulic governor which is separately supplied with fuel sequentially from each plunger by the use of a governor cam lobe in addition to a pump cam lobe on an annular cam so that each pump plunger is sequentially operated on a fuel injection stroke and a governor supply stroke.

It is therefore a primary object of the invention to provide an improved multiple plunger type fuel injection pump wherein a second cam lobe is incorporated on the annular cam of the pump unit so as to continuously provide a controlled quantity of fuel to the hydraulic governor used to control movement of the control valve of the pump.

Another object of the invention is to provide an improved fuel injection pump assembly for an internal combustion engine in which the fuel delivered by the individual pump plungers to their respective associated fuel injection nozzles is controlled by a control valve that is adapted to be actuated as a function of engine operation by means of a hydraulic governor supplied with fuel by means of a separate governor cam lobe on the annular pump cam.

A further object of the invention is to provide an improved fuel injection pump that utilizes a separate cam lobe to sequentially operate a plurality of pump plungers, the number of such plungers corresponding to the number of cylinders in an associated engine, whereby these plungers will continuously supply a control fluid to the governor as a function of engine speed.

Still another object of the present invention is to provide a fuel injection pump of the above type which includes features of construction, operation and arrangement, rendering it easy and inexpensive to manufacture, and in other respects suitable for use on diesel engines.

BRIEF DESCRIPTION OF THE DRAWINGS

For a better understanding of the invention, as well as other objects and further features thereof, reference is had to the following detailed description of the invention to be read in connection with the accompanying drawings, wherein:

FIG. 1 is a cross-sectional view taken along the line 1—1 of FIG. 2 of the subject fuel injection pump constructed in accordance with the invention and having a preferred embodiment of a hydraulic governor associated therewith and with various elements of the pump shown in elevation;

FIG. 2 is an end view of the discharge end of a multiple plunger fuel injection pump in accordance with the invention;

FIG. 3 is an end view of the drive shaft end of the subject fuel injection pump taken along line 3—3 of FIG. 1;

FIG. 4 is a top view of the subject pump taken along line 4—4 of FIG. 1 showing the general outline configuration of the pump with a hydraulic governor mounted thereon;

FIG. 8 is a schematic view of the fuel injection pump of FIG. 1 and of a preferred embodiment of a hydraulic governor, both the pump and governor being shown schematically and operatively connected to a source of fuel.

DETAILED DESCRIPTION OF THE DRAWINGS

Figure 5:
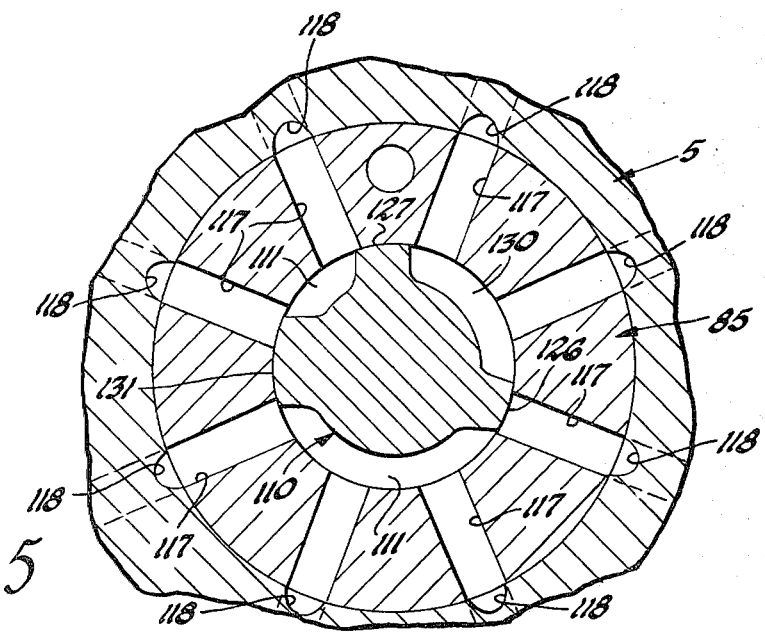
FIG. 5 is a cross-sectional view of the pump control valve and valve sleeve of the subject fuel injection pump assembly taken along line 5—5 of FIG. 1.

Referring now to the drawings and in particular to FIG. 1, the fuel injection pump, generally designated 1 of the invention includes a pump housing 2 which, in order to facilitate assembly of the internal components of the pump assembly, is formed so as to include a housing 4, a pump body 5 and a cover 6. The pump body 5 and housing 4 are suitably secured together as by bolts 7 (FIG. 2). The cover 6 is suitably secured to the pump body 5, as by capped screws 8.

The housing 4 at its free end, the left end with reference to FIG. 1, is provided with a radially outward extending mounting flange 10 having a plurality of bolt receiving arcuate apertures 11 extending therethrough (FIGS. 1, 3), whereby the pump assembly can be mounted to an internal combustion engine, not shown, so as to be driven thereby in a manner to be described. Apertures 11 permit limited rotation of pump 1 on a timed engine, not shown, whereby the pump can be statically timed to the engine in a known manner.

Housing 4 is provided with an axial stepped through bore to provide, in the construction shown, starting from the left with reference to FIG. 1, an outboard inner wall 12, a bearing receiving inner wall 14, an intermediate inner wall 15 and a cage receiving inner wall 16, all of these internal walls being cylindrical. Walls 14, 15 and 16 are of progressively larger internal diameter relative to the internal diameter of wall 12. Walls 12 and 14 are interconnected by a flat shoulder 17. Walls 14 and 15 are interconnected by a stepped shoulder which includes a flat cam bearing surface 18 of a suitable predetermined radial extent. Walls 15 and 16 are interconnected by a flat shoulder 20.

A drive shaft 21, which would be driven through a suitable power take-off from the engine, not shown, is rotatably journaled by a pair of axially spaced apart bearings 22 which are supported by the wall 14. As seen in FIG. 1, the drive shaft 21 is provided toward its outboard or left end with a stepped T-shaped groove 24 which is adapted to receive an annular seal 25, also of T-shape in cross-section. Annular seal 25, in turn, is sealingly encircled by a seal sleeve 26 that is press fitted into the portion of the stepped bore in the housing 4 defined by the wall 12 so as to abut against shoulder 17. An O-ring seal 27 is positioned to encircle seal sleeve 26 so as to abut against the lower end of housing 4 to effect further sealing when the pump assembly 1 is mounted to an engine, not shown.

The drive shaft 21 is provided, at its inboard end, with a pair of opposed flats 28, on its outer peripheral surface to provide driving engagement surfaces for abutment against a complimentary shaped internal drive bore 31 formed in an annular cam 30 so as to provide opposed driven flats 137 in the cam.

Now in accordance with the invention, cam 30 has an annular angled upper first cam surface or injection cam lobe 32 and a second cam surface or governor lobe 33, as shown in FIGS. 1 and 8 to effect reciprocation of a plurality of pump plungers by means of cam followers, all to be described in detail hereinafter whereby to sequentially effect injection of fuel to the injectors, not shown, and to also supply fuel to a hydraulic governor, generally designated 200, to be described. The lower flat bearing surface 30b of cam 30 which engages cam bearing surface 18 of housing 4 is provided with at least one radial groove 34 and an annular groove 35 which intersects the groove 34 for the flow of oil to effect lubrication of the surfaces 30b and 18.

In the construction shown, the drive shaft 21 is retained against axial displacement with respect to the bearings 22 by means of a thrust washer 36 which abuts against the radial shoulder 23 of housing 4 by a retaining ring 37. The retaining ring 37 is positioned in a suitable annular groove provided for this purpose in the drive shaft 21. In addition, an annular O-ring seal 38 is positioned in a suitable annular groove provided for this purpose, for example, in the drive shaft 21 to effect a fluid seal between the shaft and the internal drive bore 31 of cam 30.

The drive shaft 21 at its outboard end, the left end with reference to FIG. 1, is provided, in the construction shown, with opposed driving flats 40 and with a pilot hub 41 whereby the shaft can be connected via a suitable coupling, not shown, to a power take-off of an engine, not shown.

Referring now to the pump body 5, in the construction illustrated, this pump body includes a cylindrical stepped boss 44 at its left hand end, with reference to FIG. 1, a cylindrical right-hand boss 45 and an integral, intermediate radial flange 46 therebetween. Flange 46 is suitably machined or otherwise formed so as to provide a flat radial mounting flange surface 47 adjacent to its outer peripheral edge for abutment against the flat, right-hand annular end surface 4a of the housing 4, and a flat left-hand surface 48 (FIG. 1). The mounting flange surface 47 and flat surface 48 are interconnected by a cylindrical outer wall 50 which is of a diameter so as to be slidably received by the wall 16 in housing 4. A ring type seal 51 is positioned in an annular groove 52 provided, for example as shown, in the wall 50, whereby the seal 51 can provide a fluid tight seal between the pump body 5 and an upper portion of the inner wall 16 of the housing 4.

Pump body 5 is formed with a central axial through bore to provide a cylindrical internal wall 55 of predetermined inside diameter. Pump body 5 is also provided with a plurality of circumferentially, equally spaced apart stepped bores 56 which extend through the flange 46 radially outward of the bosses 44 and 45. The number of bore 56 corresponds to the number of cylinders in the engine with which the subject pump assembly is to be used, there being eight such bores 56 in the construction illustrated for use with an eight cylinder engine. Only one such bore 56 is shown in FIG. 1.

A pump follower cage 60, in the form of a cylindrical sleeve, is positioned in the housing 4 so as to be aligned by the cage receiving inner wall 16 of the housing 4. This cage 60 is axially retained by having its left-hand end, with reference to FIG. 1, in abutment against the shoulder 20, and its axial extent is such that its opposite end is located so as to preferably abut against the flat surface 48 of the pump body 5. The pump follower cage 60 is also provided with a central, axial through bore 61 and with a plurality of circumferentially equally spaced apart follower guide bores 62 located radially outward of bore 61. The number of such guide bores 62 will, of course, correspond to the number of bores 56 in the pump body 5. Each such guide bore 62 is axially aligned with an associated bore 56. Only one such follower guide bore 62 and its associated bore 56 is shown in FIG. 1.

Each such follower guide bore 62, in the pump follower cage 60, has a cylindrical cam follower 63 slidably mounted therein. Each cam follower 63 carries at its lower end a roller shaft 64 which rotatably supports a suitable cam follower roller means 65 positioned for rolling contact engagement with the upper cam surfaces 32 and 33 of cam 30 whereby to effect reciprocation of an associated pump plunger 66. Each cam follower 63 has a plunger 66 operatively associated therewith, the plunger 66 being reciprocably mounted in an associated cylinder bore 67a of a plunger bushing 67 suitably secured in an associated stepped bore 56.

Each plunger bushing 67, in the construction shown, is secured in its associated stepped bore 56 by a retraction valve holder 68, the lower end of which is threadedly engaged with the internally threaded upper end of the cylinder bore 67a in the associated plunger bushing 67. Suitable gaskets 69 and 69a are positioned to effect a seal between the fitting 68 and pump body 5 and between the pump body 5 and plunger bushing 67, respectively.

As seen in FIG. 1, each such plunger 66 is normally biased in a direction, to the left with reference to FIG. 1, by means of a follower spring 70. As shown, one end of a follower spring 70 is in engagement with a stepped portion of its associated plunger bushing 67 and the other end of the spring is in engagement with a notched plunger retainer 71 secured in an annular undercut portion 66a of its associated plunger 66. The follower spring 70 is also operative to bias the cam follower roller 65 of the associated cam follower 63 into driven engagement with the upper cam surfaces 32 and 33 of cam 30.

As shown in FIG. 1, each cam follower 63 is provided with a flat outer side wall portion 63a intermediate its ends and formed at right angles to the axis of the roller shaft 64. This side wall portion 63a is located so as to prevent rotation of the cam follower 63 by engaging a split ring 54 located in an annular groove 60a provided in the outer peripheral wall of cage 60. The split ring 54 is of a suitable width so that the inner peripheral edge thereof projects part way into each of the follower guide bores 62 for effecting non-rotational alignment of the cam follower.

For a purpose to be described, each retraction valve holder 68 is provided with a stepped through bore which at is inboard end defines an axial passage 72 that is in communication at one end with the cylinder bore 67a and intermediate its end is in communication with an intersecting radial passage 73 extending through the retraction valve holder 68. At its outboard end this bore in the valve holder 68 defines a cylindrical internal wall 74, that is partly threaded, which is adapted to receive a retraction valve seat 75 and to also receive the external threaded end of a fitting 76. As shown schematically in FIG. 7, each fitting 76 is adapted to be connected by an injection conduit 100 to an associated fuel injection nozzle 101.

Each fitting 76 is provided with a stepped axial through bore to define an outlet passage 77 at its outboard end, with reference to FIG. 1, and an enlarged valve receiving cavity 78 at its inboard end. The retraction valve seat 75, in the form of a centrally through apertured bushing, has its reduced diameter right-hand end received in the left-hand end of the cavity 78 in fitting 76 and its enlarged left-hand end loosely received in the outboard internal wall 74 of the retraction valve holder 68 whereby this retraction valve seat 75 and an associated washer-gasket 80 are retained in the retraction valve holder by the fitting. A conventional retraction valve 81 having an axial passage 81a and radial side passages 81b is slidably received in the through aperture 75a in the retraction valve seat 75. The reduced diameter head 81c of the retraction valve 81 has a spring seat 82 supported thereon.

The retraction valve 81 is normally biased into a closed position, the position shown in FIG. 1, by means of compression spring 83 which abuts at one end against the head of the spring seat 82. The opposite end of spring 83 abuts against the flange shoulder of a conventional notch apertured valve stop 84 that is loosely received within the fitting 76.

As is well known, the retraction valve 81 and spring seat 82 are of a suitable configuration whereby to be operative so as to serve both as a check valve and as a retraction valve. Although a particular form of retraction valve and fitting arrangement has been illustrated and described, it will be apparent that other forms of retraction valves which are also operable as both check valves and retraction valves can be used in lieu of the specific retraction valve arrangement described and illustrated. For example, a ball type retraction valve and fitting arrangement, similar to that shown, for example, in the above-identified U.S. Pat. No. 3,648,673 can be utilized in lieu of the retraction valve and fitting arrangment shown.

Fuel flow to and from each of the pump chambers, as defined by plungers 66 and plunger bushing 67, and the control discharge of fuel to the nozzle 101 through the conduits 100 is effected by means of a control valve 110 housed in the pump body 5 and a hydraulic actuated advance mechanism associated therewith in a manner to be described.

A control valve sleeve 85, which can be formed as part of the pump body 5, or as shown, can be a separate element secured, as by a shrink fit, in the bore wall 55 of pump body 5, has a bore 86 therethrough.

Bore wall 55 and therefore bore 86 are closed at the outboard or right-hand end of the pump body 5, with reference to FIG. 1, by the cover 6. As shown in this Figure, sleeve 85 is positioned in pump body 5 so that its outboard or right-hand end surface 85a is located a predetermined axial distance away from the inboard surface 6a of cover 6 whereby to define an annular supply passage 87 for a purpose to be described. As shown, an annular seal 88 positioned, for example, in an annular groove provided for this purpose in the pump body 5 is used to effect a fluid type seal between the pump body 5 and cover 6. As shown in FIG. 1, the cover 6 is provided with a threaded aperture centrally thereof to adjustably receive an adjusting screw 90 which can be locked, as desired by a pair of lock nuts 91 one of which abuts against a seal ring 92 that abuts against the outboard surface of cover 6. The adjusting screw 90 is threaded to the cover 6 so that one end thereof projects a predetermined distance into the bore 86 of the control valve sleeve 85 for a purpose described in detail hereinafter.

A control valve 110 is axially and rotatably movable within bore 86 of control valve sleeve 85 and forms with it a fuel supply annulus or chamber 111 that, in operation, is filled with fuel entering by way of an inlet passage 112 having an axial extending portion in pump body 5 that intersects an annulus 114 also provided in the pump body. As seen in FIG. 1, annulus 114 is positioned so as to be aligned with a plurality of radial ports 115 provided in the control valve sleeve 85 whereby fuel can be supplied to the fuel supply chamber 111. Fuel supply chamber 111 is also in fluid communication with a plurality of circumferentially, equally spaced apart, radial spill ports 117 provided in the sleeve 85 (FIGS. 1 and 5), the number of these spill ports 117 corresponding to the number of cylinders in the engine, not shown, eight such spill ports 117 being shown in FIG. 5 in the pump structure illustrated for use with an eight cylinder engine.

Each such spill port 117 in sleeve 85 is, in turn, aligned with one end of an associated inclined radial passage 118 in the pump body 5. As best seen with reference to FIG. 1, each such radial passage 118 is located and inclined so as to extend from bore wall 55 of the pump body whereby to intersect the enlarged upper portion of an associated bore 56 in the pump body at a position for through fluid communication with the radial passage 73 of an associated retraction valve holder 68. As will be apparent the number of radial passages 118 will also correspond to the number of the cylinders in the engine, not shown.

Each spill port 117 and its associated passage 118 form, in effect, a spill passage 117-118.

Control valve 110, a spool-type valve, is adapted to have both axial and rotational movement within the control valve sleeve 85 whereby to variably close or open the radial passages 117, the rotation of this valve being properly phased to the displacement of plungers 66 as determined by the profile of cam surfaces 32 and 33. Control valve 110 is of suitable axial extent and has straight circumferential outboard, middle and inboard seal lands 120, 121 and 122, respectively, that are connected by neck portions 123 and 124 of reduced diameters to form with the control valve sleeve 85, a governor fuel supply annulus or chamber 125 and the previously identified fuel supply chamber 111.

The outside diameters of the lands 120, 121 and 122 are sized relative to the internal diameter of bore wall 86 whereby to effectively seal the annular internal fuel chambers 111 and 125 defined between these lands from each other and so that rotational movement of the control valve 110 will be operative to control fuel flow into and out of radial spill ports 117.

Figure 7:
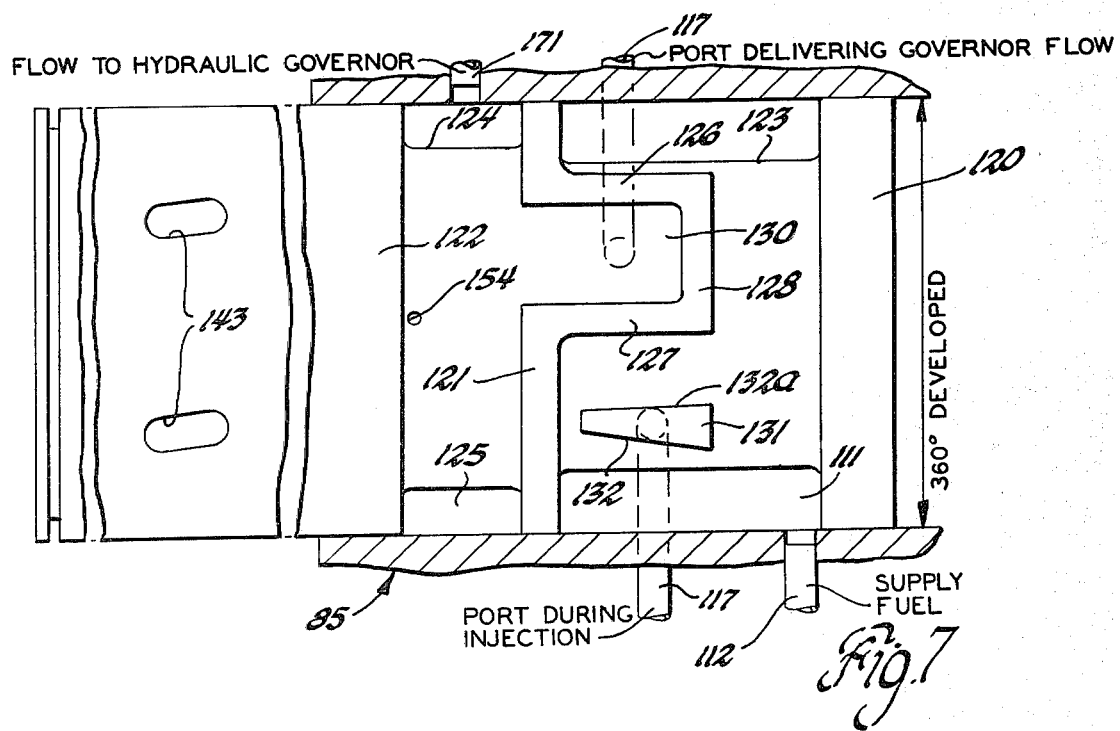
FIG. 7 is an enlarged developed view of the control valve of FIG. 1.

As best seen in FIGS. 5 and 7, the middle land 121 has axial extending seal land portions 126 and 127 that are interconnected by a circumferential extending seal land portion 128. These seal land portions 126, 127 and 128 form therebetween a spill scallop or slot 130 that is sequentially placed in communication with each of the spill ports 117, for a purpose to be described. Circumferential lands 120 and 122, and in addition to seal land portion 128 in the construction shown are formed at right angles to the longitudinal axes of the control valve 110, with the open end of slot 130 in fluid communication with governor supply chamber 125. In addition, the control valve 110 is provided with an injection seal land 131 of trapezoid configuration in the construction illustrated, which is located between lands 120 and 121 and with its longitudinal control edge sides 132 and 132a suitably circumferentially spaced predetermined angular distances from the outside edges of seal land portions 126 and 127, respectively, as best seen in FIG. 7.

As will be apparent to those skilled in the associated art, the bridge width of the seal land portions 126 and 127 must be slightly larger than the width of spill ports 117 to prevent crossover of fluid from the supply chamber 111 to the governor supply chamber 125.

The free end, right-hand end with reference to FIG. 1, of the control valve 110 forms with the internal wall defined with bore 86 of sleeve 85 a variable volume, governor pressure chamber 133 for a purpose to be described.

Control valve 110 is operatively connected to the drive shaft 21 for rotation therewith by means of a drive rod 134, with means, in the form of a hydraulic advance mechanism to be described, being associated with this drive rod 134 to adjust the control valve 110 rotatably with respect to drive shaft 21 whereby to control fuel injection timing relative to engine speed.

As shown in FIG. 1, the rod drive 134 has one end thereof, the right-hand end with reference to FIG. 1, shaped in the form of a cylindrical piston 134a that is slidably engaged in the axial stepped blind bore 135 which extends from the outboard end of the control valve 110 with respect to control valve sleeve 85. The opposite or driven end of the rod 134 is loosely received in a blind bore 136 provided for this purpose on the inboard end of the drive shaft 21.

To effect a driving connection between the drive shaft 21 and rod 134, a drive plate 138 having opposed driven flat surfaces 138a is positioned in the drive bore 31 of cam 30 whereby it is, in effect, driven by cam 30 as rotated by drive shaft 21.

In addition, the drive plate 138 is provided with a through aperture that is appropriately shaped so as to define at least one pair of opposed drive flats, not shown, that are adapted to abut and effect the drive engagement between the drive plate 138 and the driven end of rod 134 which is also provided with at least one pair of opposed driven flats 141. The driven flats extend longitudinal a predetermined distance on the drive rod 134 for a purpose described in detail hereinafter. The driven end of drive rod 134 is sized relative to the through aperture in the drive flat 138 so that drive rod 134 is slidably received therein.

The drive rod 134 in turn drives the control valve 110 by means of a drive pin 142 which extends through a radial aperture provided for this purpose in the rod 134 whereby opposite ends of the drive pin 142 extend radially outward a suitable distance from diametrically opposite sides of the rod 134. Each end of the drive pin 142 is thus adapted to extend through one of an associated slot 143 of a pair of opposed axial extending helical slots 143 provided for this purpose at a suitable axial location on the control valve 110.

Control valve 110 is normally biased in an axial direction, to the right with reference to FIG. 1, to reduce the volume of the governor pressure chamber 133, with axial movement of the control valve 110 in this direction being limited by the axial position of the adjusting screw 90. This biasing force is applied by means of a coil governor spring 144 positioned so as to loosely encircle the driven end of the control valve 110 with one end of this spring 144 being positioned to abut against a drive plate retainer 145 and its opposite end abutting against a governor spring seat 146 which is axially retained by means of a split retainer ring 147 secured in a suitable annular groove provided for this purpose on the outer peripheral surface of the valve 110 with a washer like spring pivot 148 positioned therebetween.

In addition a coil advance spring 150 is positioned so as to encircle the control valve 110 radially inward of the governor spring 144 (FIG. 1). As shown, one end of the advance spring 150 abuts against a washer-like advance spring seat 151 that is retained against axial movement in one direction by a second split retainer ring 147 positioned in an annular groove provided for this purpose in the control valve next adjacent to its outboard free end, the left-hand end with reference to FIG. 1. The opposite end of the advance spring 150 abuts against a second advance spring seat 151 which in turn abuts against a thrust washer 152 forced into abutment against the drive pin 142. Preferably, the free ends of the drive pin 142 are suitably notched so as to provide flats thereon against which the thrust washer 152 can abut.

As seen in FIG. 1, the piston end 134a of rod 134, which is slidably received in the bore 135 of the control valve 110, defines with this bore an advance pressure chamber 153. This advance pressure chamber 153 is supplied with pressurized fuel from the governor fuel supply chamber 125 via one or more radial passages 154 provided in the control valve 110.

Thus during operation of the pump, as driven by the engine, not shown, as engine speed increases, the pressure of fuel in the governor fuel supply chamber 125 will increase correspondingly and, as this pressure increases, it will act in the advance pressure chamber 153 against the end of rod 134. As this fuel pressure increases sufficiently to overcome the predetermined bias of the advance spring 150, it will effect movement of the rod 134 in an axial direction, to the left with reference to FIG. 1. As this occurs, the drive pin 142 carried by the rod 134 in sliding engagement in the helical slots 143 in the control valve 110 will effect rotative movement of the control valve 110 relative to the drive shaft 21, this movement being limited by the helix angle of the helical slots 143. In the construction shown, the helical slots 143 are so inclined at a predetermined angle, as desired for a particular engine application, whereby as rod 134 is moved to the left with reference to FIG. 1, the drive pin 142 moving in the slots 143 will effect counter-clockwise movement, with reference to FIG. 3, of the control valve 110 relative to drive shaft 21. As seen in this Figure, drive shaft 21 is driven in a counter-clockwise direction in the embodiment of the fuel injection pump 1 illustrated. Then as engine speed decreases, the pressure of fuel in the governor fuel supply chamber 125 will decrease, allowing the advance spring 150 to again bias the rod 134 to the position shown in FIG. 1, whereby to effect rotation of the control valve 110 in a clockwise direction, with reference to FIG. 3.

In accordance with the subject invention, during the operation of the fuel injection pump 1, each plunger 66 thereof is actuated two times during each drive revolution of drive shaft 21. Thus in accordance with the invention, in addition to the usual injection cam lobe, such as lobe 32 on cam 30, there is provided a second governor cam lobe 33 on the cam 30 which is provided to supply hydraulic fluid to a hydraulic governor 200 so that the flow thereto is proportional to pump (or engine) speed. With this arrangement it is then possible to obtain a flow rate of hydraulic fluid to a governor which is exactly proportional to pump speed and therefore engine speed. Thus this hydraulic fluid flow rate to the governor will not be interrupted as is the case in a pump of the type described in the above-identified U.S. Pat. No. 3,648,673.

For the purpose of a functional description of the subject fuel injection pump 1, the subject fuel injection pump 1 is shown schematically in FIG. 8 with both cam lobes 32 and 33 shown for this purpose. Although any suitable hydraulic governor 200 may be used with the subject fuel injection pump 1, a preferred embodiment of such a hydraulic governor 200 is schematically illustrated in FIG. 8 as operatively connected to the pump 1 and to a source of fuel.

As shown in FIGS. 1 to 4, the housing means 201 of the governor 200 is suitably fixed, as by machine screws 155, to a machined flat 46 provided for this purpose on pump housing 4, FIGS. 1 to 4.

As shown in FIG. 8, the fuel injection pump 1 is supplied with fuel by a low pressure, engine driven fuel pump 160 from a fuel reservoir 161 via an inlet conduit 162 and a supply conduit 163. In the embodiment illustrated, supply conduit 163 is in flow communication with an inlet fitting and passage means 202 suitably provided in housing means 201. As schematically illustrated in FIG. 8, the inlet fitting and passage means 202 in housing means 201 includes an inlet branch passage 202a (FIG. 2) that communicates with the vertical extension 112a (FIG. 2) of inlet passage 112 in pump body 5 and an inlet branch passage 202b that connects with an L-shaped lubricating passage 164 (FIG. 1) in housing 4 used to supply fuel for lubricating purposes to the bearings 22 and to grooves 34 and 35 in cam 30 to provide for lubrication of the surface 30b of cam 30 relative to surface 18 of housing 4. Housing means 201 is also provided with a drain passage 203 (FIG. 3) that is connected at one end to a drain port 165 in housing 4 (FIG. 1) and is connected at its other end by a conduit 204 for returning fuel to reservoir 161, (FIG. 8).

Again referring to FIG. 8, the subject fuel injection pump 1 is schematically illustrated as having a plunger 66 riding on the injector cam lobe 32 with fuel being pumped and injected out through an injection nozzle 101 while the associated spill port 117 is covered by the injector seal land 131. As will be apparent, spill flow prior to spill port 117 closure, and after opening of this spill port as the injection seal land 131 passes it will return to the supply annulus or chamber 111. In prior art pumps of the type disclosed in the above-identified U.S. Pat. No. 3,648,673, this spill was collected and directed to the hydraulic governor of such a pump unit. Of course in such a prior art pump, this spill flow would be interrupted during injection and therefore the governor in such a unit was not continuously supplied with governor fluid.

Another plunger 66 is shown in FIG. 8 as riding on the governor cam lobe 33 whereby to deliver fuel through an associated spill port 117, slot 130, and governor supply chamber 125 with fuel from this chamber then being delivered to the hydraulic governor 200 in a manner to be described. The hydraulic governor 200 is adapted to provide an appropriate "control pressure" to the governor pressure chamber 133 whereby the fluid therein will act on the end of the control valve 110 to properly locate the control valve axially within the control valve sleeve 85 as a function of speed and throttle position in a manner to be described. As previously described, the motion of the control valve 110 is resisted by the governor spring 144.

Figure 6:
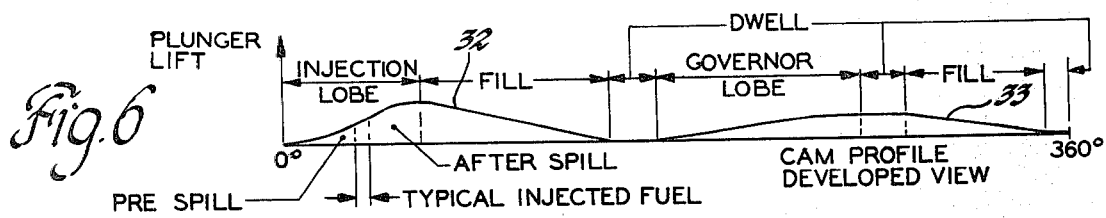
FIG. 6 is a developed view of the profile of the annular cam of the fuel injection pump of FIG. 1.

In accordance with the subject invention, the separate governor cam lobe 33 is used in the subject fuel injection pump 1 so as to provide uninterrupted flow of pressurize and hydraulic fluid in the form of fuel to the hydraulic governor 200. In order to maintain a constant flow rate of hydraulic fluid to the governor at any speed, the governor cam lobe 33 is of a particular design with the respect to length and shape. It has been established that the length of the governor cam lobe 33 should be two times the spill port 117 (or plunger 66) circumferential spacing. Thus, in the case of an eight cylinder pump, the length of the governor cam lobe 33 should be $2 \times (360° \div 8 \text{ cyl.}) = 90°$. In the case of a six cylinder pump, the governor cam lobe 33 length would be $2 \times (360° \div 6 \text{ cyl.}) = 120°$. Preferably the shape of the governor cam lobe 33 is cycloidal whereby to provide a sine wave acceleration curve for movement of a plunger 66. The lift of the governor cam lobe 33 and the size of the plungers 66 determines the amount of hydraulic fluid directed to the hydraulic governor 200. It has been found that the spacing between the injector cam lobe 32 and the governor cam lobe 33 is not particularly critical. See FIG. 6 for a 360° developed view of the profiles of cam lobes 32 and 33.

With the above described length and shape of the governor cam lobe 33 for a particular pump, it will be apparent that more than one plunger 66 will be acted on, either on a pump stroke or a return stroke by this cam lobe 33 so that the rate of fluid flow being discharged by one or more plungers will always be constant for a particular pump speed. This is made possible by the use of a cycloidal cam shape with the developed length there of equal to two times the circumferential spacing of the spill ports 117 of a particular pump.

The fuel injection pump 1 is phased so that as each of the pumping plungers 66 is driven in turn by the governor cam lobe 33 on the cam 30, the spill port 117 for that plunger 66 is in register with the slot 130 in the bridge section of the control valve 110. The flow of hydraulic fluid, i.e., fuel, thus pumped by each plunger 66 is discharged to the governor supply annulus or chamber 125 and discharged from the pump to the governor 200 through one or more spill ports 170 in control valve sleeve 85 to an annulus 171 surrounding this sleeve 85 (FIG. 1), and then via a governor supply passage 172 in housing 4 to the hydraulic governor 200. Due to the high volumetric efficiency of the pumping elements, the flow rate of fluid thus derived for delivery to the governor 200 is directly proportional to the rotational speed of the pump 1 as well as to the speed of the engine, not shown, since it is directly driven thereby. Therefore, this flow rate may be used as a speed signal in the circuitry of the hydraulic governor to be described.

As shown in FIG. 8, this pumped flow of fluid enters the flow circuit in the housing 201 of the hydraulic governor 200 through a conduit passage 205 having a filter element 206 therein to a first control chamber 210 then through an overspeed orifice 211, of predetermined diameter, to a subsequent or second control chamber 212. The flow of fluid then proceeds from chamber 212 via passage 213 to a spring 214a biased metering valve 214 containing a parallel idle governor orifice 215, of predetermined flow diameter, thence to a third chamber 216 from which it discharges through a spring 217a biased pressure regulator valve 217. The chamber in housing means 201 containing spring 217a is vented to substantially atmospheric pressure as by being connected via a conduit passage 219 and conduit 204 to the fuel reservoir 161 above the normal level of fuel therein in a conventional manner.

From the pressure regulator valve 217. Flow is ducted through suitable passages 218, 220 and 221 in housing means 201 to the metering sections 222, 223 and 224, respectively, of each of three servo control valves 225, 226 and 227, respectively, as well as through a shut-off orifice 228 in conduit passage 230 to the governor pressure chamber 133 at one end of the pump control valve 110 in pump 1. Valve 225 is an overspeed servo control valve, valve 226 is a maximum output servo control valve and, valve 227 is a governor servo control valve.

The pressure in the governor pressure chamber 133 causes a biasing force against the inboard end of control valve 110 which is opposed by the governor spring 144 which, working together, serve to axially position the control valve 110 in control valve sleeve 85 to, thus control pump output through the injection control valve helix, that is, injection seal land 131 on the control valve. From the valves 225, 226, 227, flow is ducted through passages 231, 232 and 233 and via branch passage 202a to the supply inlet passage 112 of the pump 1 and thus recirculated.

As schematically illustrated in FIG. 8, an operator actuated throttle lever 234 is permanently affixed to one end of a rotatable shaft 235 journaled in housing means 201. The opposite end of shaft 235 is fixed to cam 236. A follower 237 is slidably mounted in housing means 201 so as to ride on the contoured surface of the cam 236 and it is retained thereon by a suitable spring 238 whose opposite surface is grounded against the governor servo control valve 27. In this manner, when the throttle lever 234 is rotated, the axial position of follower 237 will be changed due to the action of the cam 236, thus producing greater or lesser biasing force of spring 238 against the face of the governor servo control valve 227.

MODES OF GOVERNOR OPERATION

1. General

Configuration of the above identified connecting passages is such that in operation the pressures at the servo valve metering sections 222, 223 and 224 and at the governor pressure chamber 133 acting on one end of the control valve 110 are equal. The control valve helix of the injection seal land 131 of the control valve 110 is configured such that as this pressure increases, spill port 117 closure duration and, thus, pump output also increases, and conversely when this pressure decreases, spill port 117 closure duration and thus, pump output decreases. This pressure, therefore, directly controls the output of the subject pump 1 and is termed governor pressure.

2. Idle Operation

In the engine idle mode of operation the throttle lever 234 is positioned such that minimum biasing force of spring 238 is exerted against the governor servo valve 227. Pumped governor flow proceeds through the governor 200 as described to the metering valve 214, and through the idle governor orifice 215 which develops a pressure differential between chambers 212 and 216 which is proportional to the square of the flow rate, and, therefore, to the engine speed. The biasing force of spring 214a against the metering valve 214 is such that this valve will not unport in this mode of operation. The pressure level in chamber 216 is maintained at a fixed level due to the operation of the pressure regulator valve 217; therefore, the pressure level in chamber 212 will increase as flow rate and engine speed increase, and conversely. The pressure in chamber 212 acts against the exposed face of governor servo valve 227 such that the force created opposes the throttle grounded biasing spring 238. The governor servo valve 227 is a summing type differential valve with the previously described governor pressure acting against an additional area at the metering section 224, also in opposition to the throttle grounded biasing spring 238. In this arrangement, the sum of the forces generated by the pressures in chamber 212 and in the chamber 224a surrounding metering section 224 will equal the pre-established biasing force of the spring 238 due to the metering action of the governor servo control valve 227 at its seat. Therefore, if the pressure level in chamber 212 should rise, the pressure level in the chamber 224a surrounding metering section 224 will fall in order to maintain force equilibrium on the governor servo control valve 227.

In closed loop operation, should engine speed increase, pumped flow rate will increase causing the pressure in chamber 212 to rise. This will cause the pressure level in the chamber 224a surrounding metering section 224 to reduce. Since the pressure level in the governor pressure chamber 133 acting on the control valve 110 is the same as that in chamber 224a, the control valve 110 will move to a new axial position in control valve sleeve 85, thereby reducing duration of injection and thus the amount of fuel delivered to the engine. This reduction of fuel will cause engine speed to reduce. Since the process is invertible and continuous, engine speed governing is achieved.

3. Part Throttle Operation

The fuel controlling process under part throttle operation is identical to that above described under idle operation. At part throttle condition the throttle level 234 is repositioned causing an increase in the biasing force of the governor servo valve spring 238. This will result in an increase of pressure in chamber 224a thereby causing the control valve 110 to move to an axial position that will increase fuel delivered to the engine. The resultant engine acceleration will cause the pressure differential between chambers 212 and 216 to increase until the resultant force of this pressure acting on the metering valve 214 equals the preset biasing force of the metering valve spring 214a. This will allow the metering valve 214 to unport and assume control over the pressure level in chamber 212, thus eliminating governor control through the idle governor orifice 215. If desired, the metering valve 214 may be configured to produce a constant pressure in chamber 212 independent of speed, or a slowly rising pressure level in chamber 212 for purposes of "torque shaping" the part throttle output curve for a particular engine.

4. Wide Open Throttle Operation

A separate maximum output servo control valve 226 is provided in the embodiment of the hydraulic governor 200 shown to establish control over pump 1 output under wide open throttle operation. The function of this maximum output servo control valve 226 is identical to the function of the governor servo control valve 227. Pressure from chamber 212 is applied to this valve 227 via a side branch of passage 213 and governor pressure via passage 220 is applied at the metering section 223. The maximum output valve biasing spring 240 force is preset and fixed as desired, assuring positive control of maximum output. Should the throttle level 234 be moved to a position demanding greater output than the maximum desired, the metering function will shift from chamber 224a to chamber 223a surrounding metering section 223 of valve 226 on a "lowest wins" logic basis. This output servo control valve 226 is valuable in that it establishes positive control over maximum output without reliance of tolerance stack-up in the throttle system.

5. Overspeed Operation

An overspeed serve control valve 225 and overspeed control orifice 211 are provided in the circuit of governor 200 for engine overspeed protection. The overspeed control orifice 211 causes a pressure differential to occur between chambers 210 and 212 that is proportional to the square of the flow rate and, therefore, engine speed. The pressure in chamber 210 is applied to the overspeed governor servo control valve 225 and governor pressure is applied at its metering section 222 in a manner the same as for the governor servo control valve 227. When the pressure level in chamber 210 reaches a value such that sum of forces created by the pressures in chamber 210 and chamber 222a surrounding metering section 222 equals the preset biasing force of the overspeed servo control valve spring 241 the overspeed servo control valve 225 will assume control over the governor system. Should speed increase beyond this threshold point, the pressure level in chamber 210 will likewise increase, causing governor pressure to reduce due to metering action at chamber 222a. This will result in motion of the control valve 110 to a lesser fuel delivery position in control valve sleeve 85 to correct engine speed. In this manner engine governing is restored for high speed conditions.

6. Engine Shutdown

A "normally open" solenoid valve 242 is provided in the hydraulic governor 200 for positive engine shutdown. Solenoid valve 242, which may be of any suitable type, is energized during engine operation, as by closure of an ignition switch SW-1 to connect the coil 243 of the solenoid valve 242 to a source of electrical power, such as battery 244. Solenoid valve 242 has its inlet connected to a branch 230a of of passage 230 downstream of shut-off orifice 228 and its outlet connected via a passage 245 in housing means 201 for flow communication with passage 233. The valve element 246 of solenoid valve 242 control flow through this valve. When engine shutdown is desired, voltage supplied to the solenoid is disconnected by opening of switch SW-1, allowing the valve element 246 to open, thus draining pressure from governor pressure chamber 133 at one end of the control valve 110, allowing the control valve 110 to move to a "zero" fuel position as biased by governor spring 144. The shut-off orifice 228 is included upstream of solenoid valve 242 to create sufficient restriction to the governor flow emanating from passage 218 to assure rapid fluid evacuation from pump governor chamber 133 through passage 230a. This will allow use of a relatively small solenoid valve element 242, and thus minimize electrical power consumption requirements of the solenoid valve 242.

The embodiments of the invention in which an exclusive property or privilege is claimed are defined as follows:

1. An engine driven fuel injection pump for supplying pressurized fuel sequentially to a plurality of fuel injectors for the engine, said pump including a housing having a stepped bore closed at one end and a fuel inlet passage in communication at one end with said bore and connectable at its opposite end to a source of fuel; a plurality of pumping means operatively positioned in said housing in circumferentially equally spaced apart relationship to each other; each of said pumping means having a fluid passage connected to a fuel discharge line that is connectable to one of the injectors and to a fuel spill passage; each of said fuel spill passages being in communication with said bore; a drive means including an annular cam journaled in said housing and operatively connected to said pumping means, said annular cam having thereon a pump cam lobe and a governor cam lobe spaced circumferentially therefrom for sequential cooperation with each of said pumping means; and, a hydraulic governor controlled metering means including a throttle controlled hydraulic governor and a metering control valve, said metering control valve being slidably and rotatably mounted in said bore and operatively connected at one end to said drive means for rotation therewith with a spring normally biasing said metering control valve in a direction toward said one end; said metering control valve having fluid control portions thereon operable in said bore to form therewith a fluid supply chamber in communication with said inlet passage and a governor supply chamber in communication with said hydraulic governor, the opposite end of said metering valve forming with said bore and said one end of said housing a governor pressure chamber in flow communication with said hydraulic governor; said fluid control portions including a metering helix and land portions separating said supply chamber from said governor supply chamber and being operable with each of said spill passages sequentially to control the flow of fluid to be injected therefrom during a pump stroke of each associated said pumping means as actuated by said pump cam lobe, and being operable to permit flow from an associated fuel spill passage to said governor supply chamber during a pump stroke of each said pumping means as actuated by said governor cam lobe whereby fluid is continuously supplied by said pumping means as actuated by said governor cam lobe to supply pressurized fluid to said hydraulic governor which is operative so that the pressure of fuel in said governor pressure chamber is continuously varied whereby to control axial movement of said metering control valve so as to control pump output as a function of pump speed and throttle position.

2. An engine driven fuel injection pump for supplying pressurized fuel sequentially to a plurality of fuel injectors for the engine, said pump including a housing having a stepped bore closed at one end and a fuel inlet passage in communication at one end with said bore and connectable at its opposite end to a source of fuel; a plurality of pumping means operatively positioned in said housing in circumferentially equally spaced apart relationship to each other; each of said pumping means having a fluid passage connected to a fuel discharge line that is connectable to one of the injectors and to a fuel spill passage; each of said fuel spill passages being in communication with said bore; a drive means including an annular cam journaled in said housing and operatively connected to said pumping means, said annular cam having thereon a pump cam lobe and a governor cam lobe spaced circumferentially therefrom for sequential cooperation with each of said pumping means, said governor cam lobe having an effective length at least two times greater than the circumferential spacing between adjacent said pumping means; and, a hydraulic governor controlled metering means including a throttle controlled hydraulic governor and a metering control valve, said metering control valve being slidably and rotatably mounted in said bore and operatively connected at one end to said drive means for rotation therewith and a spring normally biasing said metering control valve in a direction toward said one end; said metering control valve having fluid control portions thereon operable in said bore to form therewith a fluid supply chamber in communication with said inlet passage and a governor supply chamber in communication with said hydraulic governor, the opposite end of said metering valve forming with said bore and said one end of said housing a governor pressure chamber in flow communication with said hydraulic governor; said fluid control portions including a metering helix and land portions separating said supply chamber from said governor supply chamber and being operable with each of said spill passages sequentially to control the flow of fluid to be injected therefrom during a pump stroke of each associated said pumping means as actuated by said pump cam lobe, and being operable to permit flow from an associated fuel spill passage to said governor supply chamber during a pump stroke of each said pumping means as actuated by said governor cam lobe whereby fluid is continuously supplied by said pumping means as actuated by said governor cam lobe to supply pressurized fluid to said hydraulic governor which is operative so that the pressure of fuel in said governor pressure chamber is continuously varied whereby to control axial movement of said metering control valve so as to control pump output as a function of pump speed and throttle position.

3. An engine driven fuel injection pump for supplying pressurized fuel sequentially to a plurality of fuel injectors for the engine, said pump including a housing having a stepped central bore closed at one end and connectable to a source of fuel; a plurality of pumping means operatively positioned in said housing in circumferentially equally spaced apart relationship to each other; each of said pumping means having a fluid passage connected to a fuel discharge line that is connectable to one of the injectors and to a fuel spill passage; each of said fuel spill passages being in communication with said bore; a drive means including an annular cam journaled in said housing so as to be operatively connected to said pumping means, said annular cam having thereon a pump cam lobe and a governor cam lobe spaced circumferentially therefrom for sequential cooperation with each of said pumping means; and, a hydraulic governor controlled metering means including a throttle controlled hydraulic governor, a metering control valve and a spring biased advance mechanism, said metering control valve being slidably and rotatably mounted in said bore and operatively connected at one end to said drive means for rotation therewith and for limited rotation thereto as by connection therewith by said spring biased advance mechanism; a spring operatively associated with said metering control valve for normally biasing said metering control valve in a direction toward said one end; said metering control valve having fluid control portions thereon operable in said bore to form therewith a fluid supply chamber in communication with said inlet passage and a governor supply chamber in communication with said hydraulic governor, the opposite end of said metering valve forming with said bore and said one end of said housing a governor pressure chamber in flow communication with said hydraulic governor; said fluid control portions including land portions separating said supply chamber from said governor supply chamber and a metering helix; said metering helix being operable with each of said spill passages sequentially to control the flow of fluid to be injected therefrom during a pump stroke of each associated said pumping means as actuated by said pump cam lobe, and said land portions being operable to permit flow from an associated fuel spill passage to said governor supply chamber during a pump stroke of each said pumping means as actuated by said governor cam lobe whereby fluid is continuously supplied by said pumping means as actuated by said governor cam lobe to supply pressurized fluid to said hydraulic governor which is operative so that the pressure of fuel in said governor pressure chamber is continuously varied whereby to control axial movement of said metering control valve so as to control pump output as a function of pump speed and throttle position.

4. An engine driven fuel pump for a multicylinder diesel engine of the type therein an array of individual cylinder injection pumps surround a central bore and wherein a landed control valve, slidable in the bore, rotates in unison with engine rotations to control flow in passages connecting the bore to the injection pumps and wherein a cam rotates therewith to actuate the individual injection pumps in sequence for engine operation; characterized in that said cam has both a pump lobe and a governor lobe thereon whereby each of said individual injection pumps, each of which includes a plunger, is actuated by said cam in a pumping stroke and thereafter in a governor supply stroke; said landed control valve having control lands thereon adapted to cooperate with the passages communicating with each of said injection pumps so as to control fuel flow to an associated individual cylinder of the engine during the pumping stroke and to direct fuel to the governor supply during the governor supply stroke, the mechanism further including means communicating the pressure in the governor fluid supply to said landed control valve so as to vary its axial position in accordance with such pressure and thereby vary the amount of fuel delivered to each individual cylinder, the governor fluid supply system being so constructed and arranged that the pressure in the governor supply varies in response to the volume of fluid supplied to it, whereby the quantity of fuel supplied to the individual cylinders is positively controlled in response to engine speed.

* * * * *